US012579290B2

(12) United States Patent
Shanbhag B et al.

(10) Patent No.: US 12,579,290 B2
(45) Date of Patent: Mar. 17, 2026

(54) SHARING SECURED FILES AMONG APPLICATIONS USING AN OPERATING SYSTEM FRAMEWORK

(71) Applicant: Omnissa, LLC, Mountain View, CA (US)

(72) Inventors: Krishna Shanbhag B, Bangalore (IN); Ramanandan Nambannor Kunnath, Bangalore (IN); Venkatesh Arlagadda, Bangalore (IN); Poornananda Prabhu, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 223 days.

(21) Appl. No.: 17/964,951

(22) Filed: Oct. 13, 2022

(65) Prior Publication Data

US 2024/0028754 A1 Jan. 25, 2024

(30) Foreign Application Priority Data

Jul. 19, 2022 (IN) .............................. 202241041303

(51) Int. Cl.
G06F 21/62 (2013.01)
(52) U.S. Cl.
CPC ................................ G06F 21/6218 (2013.01)
(58) Field of Classification Search
CPC ... G06F 21/6218; G06F 21/53; H04L 63/0823
See application file for complete search history.

(56) References Cited

U.S. PATENT DOCUMENTS

| | | | | |
|---|---|---|---|---|
| 7,814,554 B1 * | 10/2010 | Ragner | .................. | G06F 21/52 |
| | | | | 713/193 |
| 9,065,819 B1 * | 6/2015 | Shanmugam | ........... | G06F 21/41 |
| 9,417,937 B2 * | 8/2016 | Gotoh | ........................ | G06F 9/54 |
| 2002/0051181 A1 * | 5/2002 | Nishimura | ............ | H04L 51/066 |
| | | | | 358/1.15 |
| 2003/0028599 A1 * | 2/2003 | Kolsky | ..................... | H04L 9/40 |
| | | | | 709/228 |
| 2010/0122313 A1 * | 5/2010 | Ivgi | ..................... | G06F 21/6218 |
| | | | | 726/1 |

(Continued)

OTHER PUBLICATIONS

'bgh' (Sep. 3, 2014). 'iphone—Importing pfx file into iOS application—Stack Overflow'. StackOverflow. 'https://stackoverflow.com/questions/10364470/importing-pfx-file-into-ios-application' (Retrieved using Wayback Machine) (Year: 2014).*

*Primary Examiner* — Catherine Thiaw
*Assistant Examiner* — Amir Mahdi Hajiabbasi
(74) *Attorney, Agent, or Firm* — Kim & Stewart LLP

(57) ABSTRACT

Disclosed are mechanisms that enable secure file sharing between applications using an operating system framework. In some examples, an extension map is received by a client device. The extension map relates a file extension to an alias file extension. A management software development kit (SDK) is used by an application. The management SDK identifies that the application originates a file having the file extension, stores the file as an extension-aliased file by changing its file extension to the alias file extension according to the extension map. The extension-aliased file is transferred to a recipient application using a file sharing utility of an operating system of the client device.

11 Claims, 6 Drawing Sheets

(56) References Cited

U.S. PATENT DOCUMENTS

| | | | | |
|---|---|---|---|---|
| 2015/0193267 A1* | 7/2015 | Shafer | ..................... | G06F 9/468 |
| | | | | 719/320 |
| 2016/0283475 A1* | 9/2016 | Panchapakesan | ..... | G06F 16/134 |
| 2016/0371495 A1* | 12/2016 | Bhat | ..................... | G06F 21/445 |
| 2020/0092332 A1* | 3/2020 | Bhattathiri | ............. | H04L 63/20 |

* cited by examiner

Management Service 120
e.g., console UI

| Extension Map 200 | | |
|---|---|---|
| Application Identifiers 203<br>e.g., originating app | File Extensions 206 | Alias File Extensions 209 |
| Umbrella / Default | .pfx | .umbrpfx |
| Browser | .pfx | .browspfx |
| Email | .pfx | .emlpfx |
| Viewer | .pfx | .vwrpfx |
| Messaging | .pfx | .msgpfx |
| Identity Manager | .pfx | .idmgrpfx |
| Browser | .pkcs12 | .xyz |
| . . . | . . . | . . . |

Extension Data 132

600

START

603 — Register Alias Extension with Operating System as Supported by a Client Application 606 — Receive File with Alias Extension 609 — Convert Alias Extension to Original Extension 612 — Store and Utilize File

SHARING SECURED FILES AMONG APPLICATIONS USING AN OPERATING SYSTEM FRAMEWORK

RELATED APPLICATIONS

Benefit is claimed under 35 U.S.C. 119(a)-(d) to Foreign Application Serial No. 202241041303 filed in India entitled "SHARING SECURED FILES AMONG APPLICATIONS USING AN OPERATING SYSTEM FRAMEWORK", on Jul. 19, 2022, by VMware, Inc., which is herein incorporated in its entirety by reference for all purposes.

BACKGROUND

While business applications suites can offer basic business functionality for organizations, it can be desirable to provide an increased level of custom functionality for enterprise employees and other users. Organizations develop enterprise applications, including workflow-specific mobile applications for sales, customer service, finance, marketing, research and development and other business processes. This way, these teams can work more efficiently, and the business can engage with customers, partners and internal teams on a deeper level. To further increase productivity, enterprises may desire to provide employees with access to their applications on many types of devices and from many locations.

Organizations and other enterprises may use multiple different applications on a client device. In some cases, files can be transferred between the applications by users. However, this can cause security and functionality problems alike. For example, some operating systems can prevent certain types of files from being transferred between applications at all. In other situations, the file is allowed to be transferred, but the operating system allows transfer to any application, while the enterprise would prefer to allow specific applications to use the file. These functionality and security issues can prevent a user or an enterprise from being able to use certain devices at all. As a result, there is a need for solutions in this area.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to secure file sharing between applications using an operating system framework or utility. Enterprises can have users complete workflows using multiple different applications on a client device. This can include transferring certain files between the various applications. However, some client device operating systems can prevent certain types of files from being transferred between applications. In further situations the operating system can allow a type of file to be transferred to any application, but the enterprise would prefer to allow certain applications to use the file while preventing others from doing so. These functionality and security issues can prevent a user or an enterprise from being able to use certain devices at all. The present disclosure describes mechanisms that enable secure file sharing between applications using an operating system framework or utility.

Figure 1:
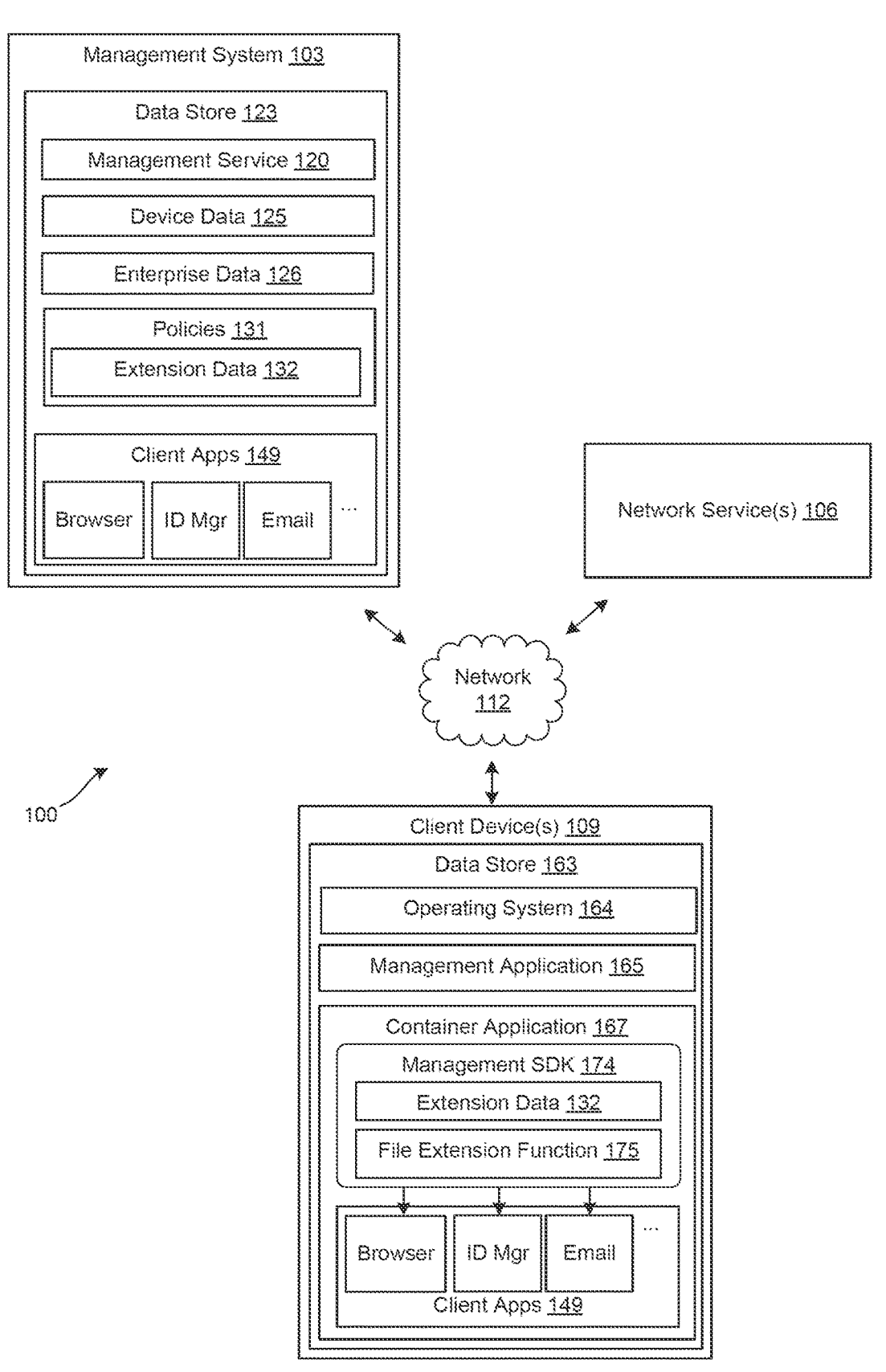
FIG. 1 is a drawing of an example of a networked environment, a management service and a client device that can enable secure file sharing between applications using an operating system of the client device.

With reference to FIG. 1, shown is an example of a networked environment 100. The networked environment 100 can include a management system 103, network service(s) 106, and client device(s) 109 in communication with one another over a network 112. The components of the networked environment 100 can provide secure file sharing between client applications 149 executed on a client device 109, the framework of functionalities provided by an operating system 164 of the client device 109.

The network 112 can include, for example, the Internet, intranets, extranets, wide area networks (WANs), local area networks (LANs), wired networks, wireless networks, other suitable networks, or any combination of two or more such networks. The networks can include satellite networks, cable networks, Ethernet networks, cellular networks, telephony networks and other types of networks.

The management system 103 can include a server computer or any other system providing computing capability. Alternatively, the management system 103 can include a plurality of computing devices that are arranged in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to in the singular. Even though the management system 103 is referred to in the singular, it is understood that a plurality of management systems 103 can be employed in the various arrangements as described above. As the management system 103 communicates with the client device 109 remotely over the network 112, the management system 103 can be described as a remote management system 103 or a collection of one or more remote computing devices.

The management system 103 can execute a management service 120 to oversee management of the client devices 109. The components executed on the management system 103 can include the management service 120, as well as other applications, services, processes, systems, engines, or functionality not discussed here in detail. An enterprise, such as one or more companies or other organizations, can operate the management service 120 to oversee or manage the operation of the client devices 109 of its employees, contractors, customers, students or other users having user accounts with the enterprise. An enterprise can be any customer of the management service 120. An enterprise can also be referred to as an organization.

The management service 120 can have a command queue storing an action to perform on a particular client device 109 upon check-in of the client device 109. For instance, the management application 165 can cause the client device 109 to check-in with the management service 120, identify an action in the command queue and perform the action. An action in the command queue can direct the installation of a profile or the execution of another command or action. This can include commands to install software components such as the client applications 149, and commands to implement policies 131 according to a profile or configuration.

In addition, the management service 120 can request that the client device 109 check in using a notification service like APPLE® Push Notification Service (APNS), GOOGLE® Cloud Messaging (GCM), or WINDOWS® Push Notification Services (WNS). The management service 120 can transmit a request to the notification service requesting that the client device 109 check-in or requesting that an application or web app check-in. The notification service can push or otherwise route a notification to the client device 109. Once the notification is received, the management application 165 or container application 167 can cause the client device 109 to check-in with the management service 120. As described above, the management application 165 can determine whether a command queue provided by the management service 120 for the respective client device 109 contains any commands or resources for the client device 109, and, if so, can cause the commands or resources to be downloaded or implemented on the client device 109. Other types of push notifications can also be transmitted through the push notification service.

The management service 120 can provide functionality using application program interfaces (APIs). The management service 120 can oversee the operation of client devices 109 enrolled with the management service 120 as well as manage enrollment and un-enrollment operations of the client devices 109. APIs or API calls can be provided for other functionalities of the management service 120 as discussed. For instance, APIs provided can include Representational State Transfer (REST) APIs, Identity Services Engine (ISE) APIs and other APIs.

The data store 123 can include memory of the management system 103, mass storage resources of the management system 103, or any other storage resources on which data can be stored and accessed by the management system 103. The data stored in the data store 123 can include the management service 120 as well as management data such as device data 125, enterprise data 126, policies 131, client applications 149, as well as other data.

Generally, device data 125 can include data associated with a configuration of a client device 109 enrolled or managed by the management service 120 as well as an identifier of the client device 109. The identifier can be a serial number, media access control (MAC) address, other network address or another device identifier. In addition, the device data 125 can include an enrollment status indicating whether a client device 109 has been enrolled with the management service 120. In one example, a client device 109 designated as "enrolled" can be permitted to access the enterprise data 126 while a client device 109 designated as "not enrolled," or having no designation, can be denied access to the enterprise data 126.

Additionally, device data 125 can include indications of the state of the client device 109. In one example, these indications can specify client applications 149 that are installed on the client device 109, configurations or settings that are applied to the client device 109, user accounts associated with the client device 109, the physical location of the client device 109, the network to which the client device 109 is connected, and other information describing the current state of the client device 109.

A policy 131 can be implemented by installing a profile such as a software development kit (SDK) profile. A policy 131, and a profile that implements the policy, can include an application-specific policy 131 or profile that can be identified using a name or other identifier of a client application 149. The management service 120 can deliver appropriate policies 131 and profiles for the client applications 149 that are installed and executed on a client device 109. In some examples, the policies 131 can be provided in an installation package along with the client application 149 or separately. The management service 120 can query or otherwise use the management application 165 or the container application 167 to identify which client applications 149 are installed on the client device 109. The management service 120 can receive this information and implement appropriate policies 131.

Policies 131 can include application-specific policies for the client applications 149 that are loaded or installed within the container application 167. Policies 131 can be applicable to a single client application 149 or multiple client applications 149. Policies 131 can also be user-specific particular user accounts, and group-specific to a group of user accounts with the management service 120. The policies 131 can be identified or modified based on a number of factors, including geographical location of the client device 109, activation status, enrollment status and authentication data, including authentication data obtained by a device registration system, time, date, and network properties, among other factors.

Policies 131 can include extension data 132. The extension data 132 can include an extension map that maps or relates actual or original file extensions to alias extensions. The extension data 132 can include application-specific extension conversions such that a first client application 149 is directed to convert a particular file extension to a first alias extension, while a second client application 149 is indicated to convert the particular file extension to a second alias extension. The extension data 132, a policy 131, or a profile, can indicate which client applications 149 are enabled or permitted to change certain file extensions into an updated or alias extension for transfer, as well as which client applications 149 are permitted to change the updated extension back to the original extension upon receipt.

The extension data 132 can indicate a set of alias extensions to identify or register with the operating system 164, in addition the set of extensions that the particular client application 149 typically handles by default. This indicates that the particular client application 149 is capable of handling these alias extensions. The client application 149 can be modified by the management service 120 or otherwise updated to identify itself as capable of handling the set of alias file extensions indicated in the extension data 132. The client application 149 can then register these alias extensions in addition to a standard set of extensions that the client application 149 would register or identify by default. In some scenarios, the client application 149 is not modified directly. The management SDK 174 include or access the extension data 132. The client application 149 can identify the set of alias extensions using a function of the management SDK 174. Alternatively, other components executed by the client device 109 such as the management application 165 or the container application 167 can update the operating system 164 to register certain alias file extensions as supported by the client application 149.

The management service 120 can communicate with the management application 165 or the container application 167 to determine which states exist on the client device 109. The states can include a list of client applications 149 that are installed, running or displayed on the client device 109. Additional states can include a list of hardware settings of the client device 109. The list of hardware settings can identify whether a hardware device of the client device 109 is enabled or disabled. For instance, a particular client application 149 can be associated with a policy 131 that requires a particular hardware setting for a Bluetooth device, a WiFi device, an infrared device, a camera device, an audio recording device, a speaker device, a near-field communication (NFC) device, a radio-frequency identification (RFID) device or another hardware device. The policies 131 or profile for a particular client application 149 can require that one or a group of the hardware devices are enabled or disabled, enable or disable automatic file extension modifications, as well as additional configurations and permissions.

The container application 167 can utilize functions defined within the management SDK 174 to implement a policy 131 for a client application 149. For example, the management SDK 174 can include functions that perform automatic file extension modifications upon identification or origination of a file, execution of the particular client application 149, loading of the particular client application 149, when the particular client application 149 is displayed on the client device 109, or when a particular menu or graphical interface component of the client application 149 or operating system 164 is displayed. Origination of a file can refer to temporarily or permanently storing a file that is generated, downloaded, or received by a client application 149.

An enterprise can operate the management service 120 to oversee or manage the operation of the client devices 109 of its employees, contractors, customers, students, or other users having user accounts with the enterprise. The management service 120 can remotely configure the client device 109 by interacting with a management application 165 or another client application 149 executed on the client device 109. The management service 120 can transmit various software components to the client device 109, which can then be installed or configured by the management application 165. Such software components can include, for example, additional client applications 149, resources, libraries, drivers, device configurations, or other similar components that require installation on the client device 109 as specified by an administrator of the management service 120.

The management service 120 can further cause policies 131 and profiles to be enforced on a client device 109. Policies 131 can include device-specific or user-specific settings, for example, restrictions or permissions pertaining to capabilities of a client device 109. For instance, policies 131 can require certain hardware or software functions of the client device 109 to be enabled or disabled during a certain time period or when the client device 109 is physically located at a particular location. Such policies 131 can be implemented by the management application 165 or the container application 167. The policies 131 can be implemented using the management SDK 174.

The client device 109 can be representative of one or more client devices 109. The client device 109 can include a processor-based system, such as a computer system, which can include a desktop computer, a laptop computer, a personal digital assistant, a cellular telephone, a smartphone, a set-top step, a music player, a tablet computer system, a game console, an electronic book reader, a smartwatch or any other device with like capability. The client device 109 can have a data store 163 that includes a management application 165, container application 167, client applications 149, client applications 149, other applications, and other data. The client device 109 can also be equipped with networking capability or networking interfaces, including a localized networking or communication capability, such as a near-field communication (NFC) capability, radio-frequency identification (RFID) read or write capability or other localized communication capability. The client device 109 can be mobile and easily portable from one location to another.

The management application 165 can perform actions on the client device 109. For instance, the management application 165 can cause the client device 109 to check-in with the management service 120, identify an action in the command queue and perform the action. An action can include the installation of a profile, or the execution of a command or other actions to install software components or implement policies. The management application 165 can cause a check-in of the client device 109 periodically, on a schedule or upon an event, such as entering a physical location, changing a state of the client device 109, installing an application or receiving a notification on the client device 109. In one example, the contents of the command queue can include a command that the management application 165 executes on the client device 109. In another example, the contents of the command queue can include a resource or a client application 149 that the management application 165 installs on the client device 109. A command to install a client application 149 can include a URL, URI, IP address or another network address where the client application 149 can be accessed. This can include an address of the management service 120 or a first or third party network service 106. A command to install a policy 131, profile, or extension data 132 can include a URL, URI, IP address or another network address associated with the where the component can be accessed. Functions described for the management application 165 can alternatively be performed by the container application 167.

The client applications 149 can be loaded and executed within the container application 167. The container application 167 and/or the client applications 149 can include a management SDK 174 that enables management functions of the management service 120. The management SDK 174 can include libraries, variables, files and code components that are utilized to perform functions based on the policies 131, profiles, and other configurations promulgated by the management service 120. In some examples, a developer does not need to add specific code to the client application 149 for the policies 131 to be applied to the client application 149. Functions that enforce or apply the policies 131 are based on the management SDK 174, rather than the application logic for the client application 149. The container application 167 can utilize a single copy or instance of the management SDK 174 on the client device 109 for all of the client applications 149. This can result in memory efficiency through reduced storage redundancy.

While the container application 167 is referred to in the singular, multiple container applications 167 can be developed corresponding to different operating systems or platforms or for different types of client devices 109. While the container application 167 can be different in each case, the same set of client applications 149 can be utilized. The respective container applications 167 can be designed to access and load the same client applications 149 for use in their respective operating systems, platforms, environments, or devices. This improves efficiency for developers, as a single version of the client application 149 can be used for multiple different devices, operating systems, environments and platforms based on the respective container application 167.

The management SDK 174 can enable the management application 165, the container application 167, and the client application 149 to fetch the security policies 131 and extension data 132 upon installation of a particular client application 149. The management SDK 174 can ensure that the communications are proxied through a particular proxy server or endpoint according to a policy 131. The management SDK 174 can include a function or instructions including a file extension function 175 that implements file extension changes. The file extension changes can enable file sharing using a file sharing extension or utility of the operating system 164. The file sharing extension can include an application programming interface (API) that is invoked by the client application 149 or the management SDK 174.

The operating system 164 can prevent sharing of files with certain file extensions from being exposed to an inter-application file sharing utility of the operating system 164. For example, APPL iOS® can include a share utility that prevents sharing certificate files with .pfx and .pkcs12 file extensions, as well as other file extensions corresponding to other file types.

In order to enable sharing of a file using the operating system 164 share utility, the file extension function 175 can automatically change file extensions according to a policy 131 or profile for a client application 149. The file extension function 175 can also automatically change file extensions for security purposes. The operating system 164 share utility can include a user interface element such as a share icon that enables sharing to a particular endpoint such as another client application 149.

When the share icon is selected, a list of applications is provided. The list of applications can be limited to applications that the operating system 164 identifies as capable of handling the particular file extension. Each client application 149 can notify the operating system 164 which extensions it is capable of handling. Since the file extension function 175 can change certain file extensions automatically this can prevent unwanted applications from being listed as a destination for the file that is updated to the alias extension, which have not registered the updated alias extension with the operating system 164. The alias extensions can include arbitrary, bespoke, and non-standard file extensions. However, a function of the management SDK 174, the management application 165, the container application, or the client application 149, can instruct the operating system 164 to register one or more alias extensions in association with a particular client application 149. As a result, the only applications that are registered as capable of handling such arbitrary, bespoke, and non-standard file extensions are those that do so according to the extension data 132.

In some examples, the endpoint can include a network service 106 accessed over a network 112. This can include a web application hosted at least in part by the network service 106. Each client application 149 can be executed in a sandboxed environment facilitated by one or more of the container application 167 and the operating system 164. In other words, a file that is stored by one client application 149 is inaccessible through the interface of the other client applications 149.

The client application 149 can be installed into a container of the container application 167. The container can specify memory areas and addresses that are accessible by the client application 149. Memory addresses that are accessible or restricted can be specified for the container of a client application 149 so that data associated with applications, including other client applications 149, can be accessible or restricted. Other memory addresses, such as system memory addresses, can also be specified as accessible or restricted for the client application 149 by its container.

Figure 2:
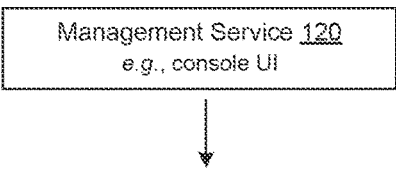
FIG. 2 is a drawing of an example of an extension map that can be used to enable secure file sharing using components of the networked environment of FIG. 1.

FIG. 2 shows an extension map 200 that can be used to enable secure file sharing using components of the networked environment. The extension map 200 can be a mapping that is part of the extension data 132. The extension map 200 can include a table or another data structure that relates application identifiers 203, file extensions 206, and alias file extensions 209.

The extension map 200 can include application-specific extension mappings. The extension map 200 can indicate that a browser client application 149 can be directed to convert files with a ".pfx" file extension 206 to a ".browspfx," alias file extension 209, while an email client application 149 is indicated to convert the same ".pfx" file extension 206 to ".emlpfx," alias file extension 209, and so on. The extension map 200 or other portions of the extension data 132 can indicate which client applications 149 are permitted to change the alias file extension 209 back to the original file extension 206 upon receipt.

The extension map 200 can map a particular application identifier 203 and file extension 206 combination to a specified alias file extension 209. In some cases, the management service 120 can ensure that the specified alias file extension 209 is unique to the combination of the application identifier 203 and file extension 206. The management service 120 can also ensure that the alias file extension 209 is unique among a set of known standard file extensions stored in the extension data 132. This can prevent various applications that may execute on the client device 109 from inadvertently being included in a list of applications capable of handling the alias file extension 209.

The management service 120 can generate a console user interface that enables a user such as an administrative user to select a client application 149 or its application identifier 203. The console user interface can provide a user interface element to enter or select an original file extension 206, as well as enter or select a corresponding alias file extension 209 for that client application 149. The user can manually enter the original file extension 206 and the alias file extension 209 in some examples.

Once the client application 149 or its application identifier 203 is selected, the console user interface can provide a list of file extensions 206 that the client application 149 typically identifies to an operating system 164 as being capable of handling. A user can select one of the file extensions 206, and then enter or select an alias file extension 209. The console user interface can provide a user interface element that automatically generates an alias file extension 209. The automatically generated alias file extensions 209 can include a predetermined prefix or predetermined suffix to append to the file extension 206 to form the alias file extension 209. The management service 120 can generate the prefix or suffix to include the application identifier 203 or an abbreviated name of the client application 149. The prefix, suffix, or entire alias file extension 209 can be randomly or pseudo-randomly generated using a character string generation algorithm or model.

The extension map 200 can also include "umbrella" or "default" mappings. An "umbrella" or "default" mapping can cause any client application 149 that uses the management SDK 174 to convert a file extension 206 to an alias file extension 209 even if a specific application identifier 203 is unspecified. This can be used as a catchall as well as to simplify some operations.

The management service 120 can maintain a list of client applications 149 used for a particular enterprise. Once the extension map 200 is updated to include additional alias file extensions 209 for various combinations of file extensions 206 and application identifiers 203, the management service 120 can update the management SDK 174 and/or client applications 149 that should report capability to handle the alias file extensions 209. Since alias file extensions 209 are non-standard and arbitrary file extensions, the client applications 149 will not show up in the operating system 164 provided file share user interface until the alias file extensions 209 are registered or identified in association with a particular client application 149.

The management service 120 can identify all client applications 149 in the list of client applications 149 that are capable of handling a particular file extension 206 in the extension map 200. The management service 120 can then associate the identified client applications 149 with all or a subset of the alias file extensions 209 for the particular file extension 206. This association can be stored in the extension data 132. The association can be used by the management SDK 174, the client application 149, the management application 165, or the container application 167 to register a particular client application 149 as capable of handing the alias file extensions 209.

Figure 3:
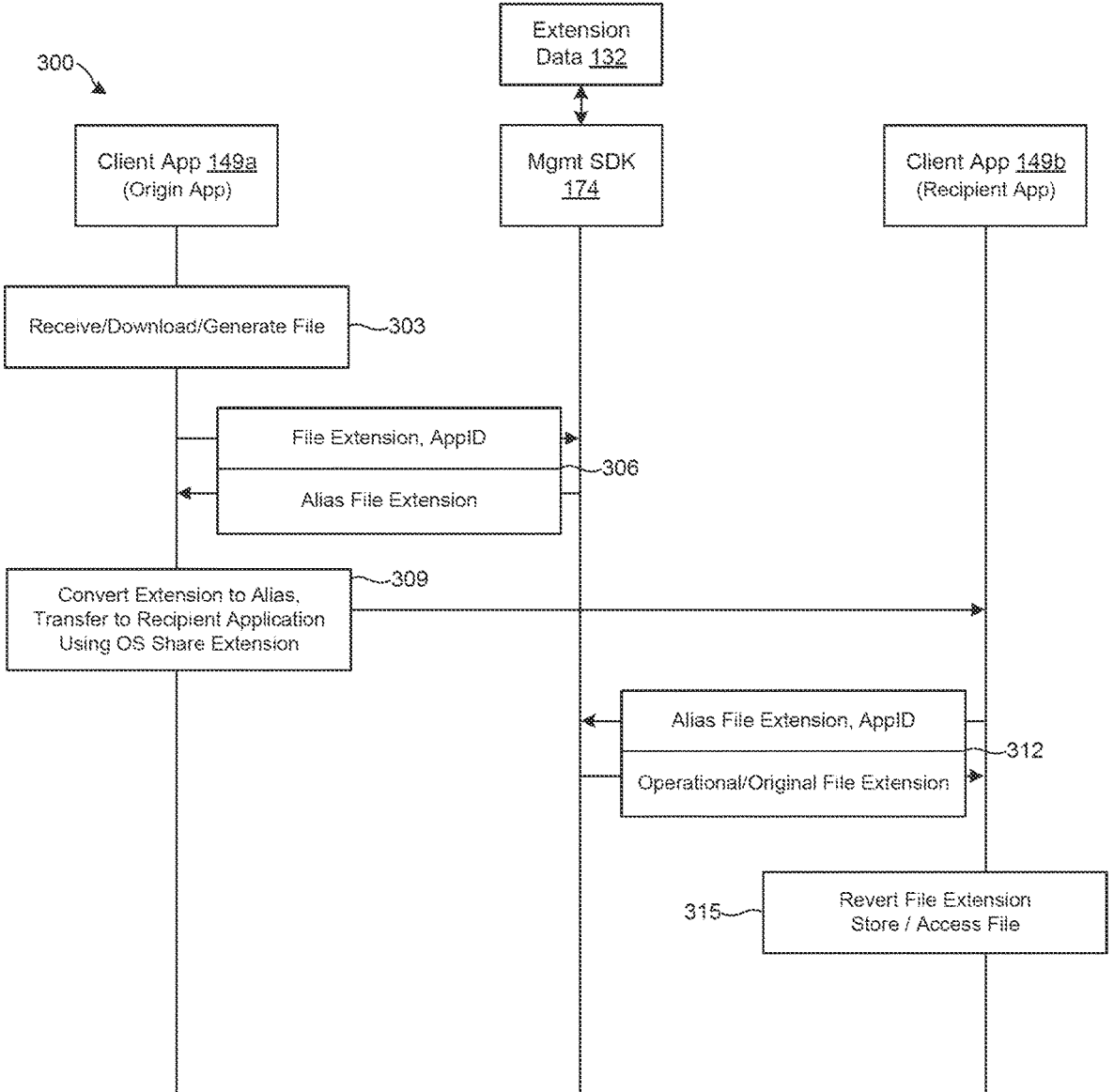
FIG. 3 is an example sequence diagram illustrating functionality implemented by components of the networked environment of FIG. 1.

FIG. 3 shows a sequence diagram 300 describing steps that can be performed by the components of the networked environment 100. Generally, the sequence diagram 200 describes how a client application 149a converts a file extension 206 for a file into an alias file extension 209, and transfers the file to a client application 149b for use. While particular steps can be described as being performed by a particular component, other components of the client device 109 and the networked environment 100 can perform aspects of the steps.

In step 303, the client application 149a can receive, download, generate, or otherwise originate a file. For example, an email client application 149a can receive a file that includes a particular file extension 206. The file extension 206 can be a standard file extension 206, such as .doc, .pfx, .pdf, .docx, or another file extension 206.

In step 306, the client application 149a can use the management SDK 174 to identify whether the file extension 206 to be converted into an alias file extension 209. For example, the client application 149a can use the file extension 206 and the application identifier 203 of the client application 149a as inputs or keys to identify the alias file extension 209. The client application 149a can use the management SDK 174 to access the extension map 200 and other extension data 132 locally on the client device 109. Alternatively, the client application 149a can use the management SDK 174 to transmit a request to the management service 120 that specifies the file extension 206 and the application identifier 203. The client application 149a can use the management SDK 174 to receive or otherwise identify the alias file extension 209 using the extension map 200 and other extension data 132.

In step 309, the client application 149a can convert the file extension 206 to the alias file extension 209. This can occur as soon as the file is detected or stored in the sandboxed memory available to the client application 149a. For example, the client application 149a, management SDK 174, management application 165, or container application 167 can monitor the memory to identify files that are stored in the sandboxed memory available to the client application 149a. This can update the file from an operative file to an inoperative file since the alias file extension 209 is arbitrary or non-standard. However, the alias file extension 209 can also enable the client application 149a to transfer the files that the operating system 164 would otherwise block from being shared using its file sharing utility.

A user can perform a user interface interaction relative to the file that initiates a file sharing request using the file sharing utility of the operating system 164. In some examples, this can cause instructions executed on the client device 109 to invoke an API associated with the file sharing utility of the operating system 164. A list of applications can be shown in response to the file sharing request. The operating system 164 can provide the list of applications that have registered the alias file extension 209 of the extension-aliased file. Since the alias file extension 209 is unique among a set of known file extensions in the extension data 132, the list of applications can be limited to client applications 149 that the enterprise has indicated to use the alias file extension 209.

The client application 149b can be included in the list since the client application 149b is registered with the operating system 164 as capable of handling the alias file extension 209. The client application 149b can receive the file transferred using the file sharing utility of the operating system 164.

In step 312, the client application 149b can use the management SDK 174 to identify the original file extension 206. For example, the client application 149b can use the alias file extension 209 and the application identifier 203 of the client application 149b as inputs or keys to identify the original file extension 206. The client application 149b can use the management SDK 174 to access the extension map 200 and other extension data 132 locally on the client device 109. Alternatively, the client application 149b can use the management SDK 174 to transmit a request to the management service 120 that specifies the alias file extension 209 and the application identifier 203 of the client application 149b. The client application 149b can use the management SDK 174 to receive or otherwise identify the original file extension 206 using the extension map 200 and other extension data 132.

In step 315, the client application 149b can revert the extension aliased file back to its original form with the original file extension 206. In some cases, this can convert the file from an inoperative file that the client application 149b cannot consume or utilize, into an operative file with a standard file extension that the client application 149b can consume or utilize. Even if the client application 149b is registered as capable of handling the alias file extension 209 for file transfer purposes, the client application 149b can nevertheless fail to actually consume or utilize the aliased file. The client application 149b can then open, consume, or otherwise utilize the reverted file such as a certificate file used for authentication actions.

Figure 4:
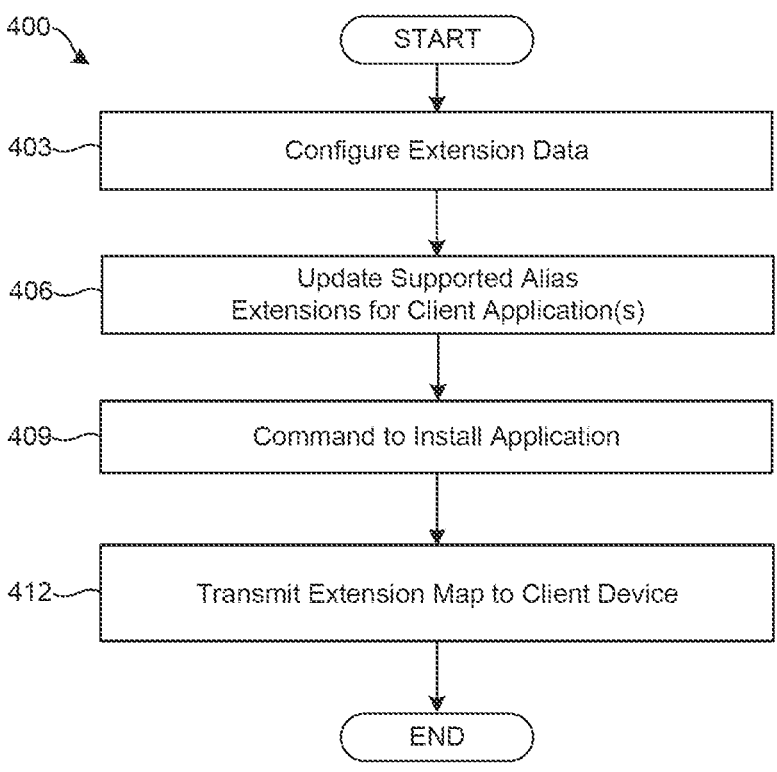
FIG. 4 is an example flowchart illustrating functionality implemented by components of the networked environment of FIG. 1.

FIG. 4 shows a flowchart 400 that illustrates functionality implemented by components of the networked environment 100. Specifically, the flowchart 400 shows how the management service 120 generates and applies extension data 132 that enables secure file sharing between applications using a file sharing utility of an operating system 164. While particular steps can be described as being performed by a particular component, other components of the client device 109 and the networked environment 100 can perform aspects of the steps.

In step 403, the management service 120 can configure extension data 132. The console user interface can provide a user interface element that generates an extension map 200. The user interface can enable a user to enter or select an original file extension 206, as well as enter or select a corresponding alias file extension 209 for that client application 149. The management service 120 can generate or update an extension map 200 to include alias file extensions 209 for various combinations of file extensions 206 and application identifiers 203.

In step 406, the management service 120 can update supported alias extensions for client applications 149 as indicated in the updated extension data 132. The management service 120 can update the management SDK 174 and/or client applications 149 that should report capability to handle the alias file extensions 209. The management service 120 can identify all client applications 149 in the list of client applications 149 that are capable of handling a particular file extension 206 in the extension map 200. The management service 120 can then associate the identified client applications 149 with all or a subset of the alias file extensions 209 for the particular file extension 206. This association can be stored in the extension data 132.

Certain client applications 149 can already be installed on client devices 109. The management service 120 can identify a client device 109 that includes a client application 149 that should be updated to support the alias file extensions 209 for the particular file extension 206. The management service 120 can transmit a command to the client device 109 that instructs a component of the client device 109 to update the operating system 164 to register the alias file extensions 209 in association with the client application 149. While referred to as transmitting a command, the command can be placed in a command queue for the client device 109 for retrieval. In various implementations, the component of the client device 109 can include one or more of the client application 149, the management SDK 174, the management application 165, and the container application 167.

In step 409, the management service 120 can transmit a command to install a client application 149 on the client device 109. The command can instruct a component of the client device 109 such as the management application 165 or the container application 167 to install the client application 149 in a sandboxed environment separate from other client applications 149 installed on the client device 109.

In step 412, the management service 120 can also transmit an extension map 200 or an updated extension map 200 to the client device 109. The extension map 200 can be transmitted along with the client application 149 or separately. The extension map 200 can include alias file extensions 209 for various combinations of file extensions 206 and application identifiers 203. This can cause the client application 149 installed on the client device 109 to automatically change file extensions 206 of certain files stored in the sandboxed environment to alias file extensions 209. The alias file extensions 209 can enable a user to transfer these files from the client application 149 to other client applications 149 that have registered the alias file extensions 209 with the operating system 164, according to the extension data 132 promulgated by the management service 120.

Figure 5:
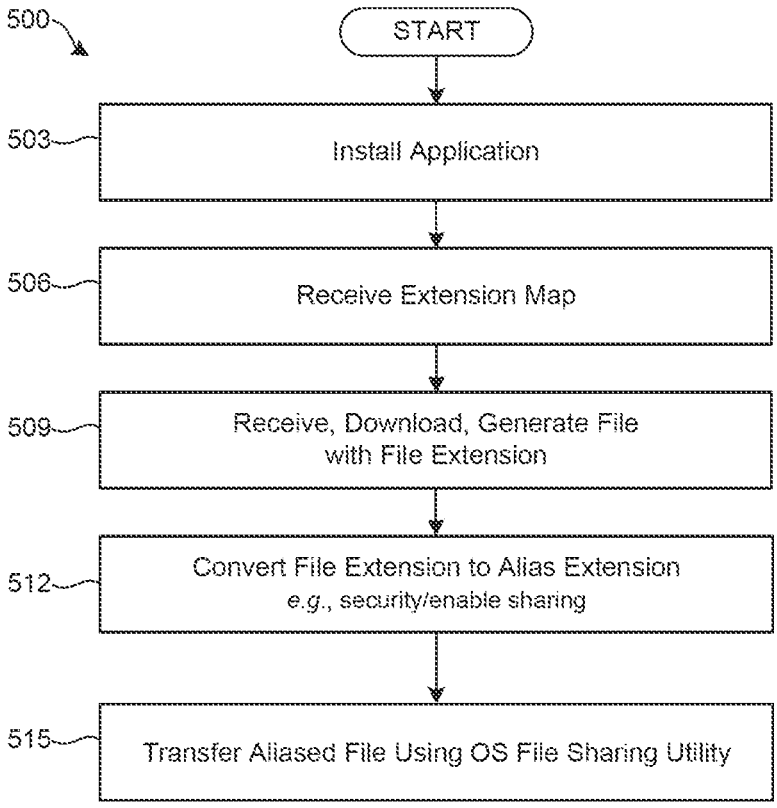
FIG. 5 is an example flowchart illustrating functionality implemented by components of the networked environment of FIG. 1.

FIG. 5 shows a flowchart 500 that illustrates functionality implemented by components of the networked environment 100. Specifically, the flowchart 500 shows how a client application 149 and other components executed by the client device 109 can use extension data 132 to transmit operating-system-protected files and other files in a secure manner. Operating-system-protected files can refer to files that include file extensions 206 that are prohibited from being shared using a file sharing utility of the operating system 164. Particular steps can be described as being performed by the client device 109 generally or a particular component. One or more components of the client device 109 and the networked environment 100 can perform aspects of the steps.

In step 503, a component of the client device 109 can receive a command to install a client application 149 on the client device 109. The management component 165, the management SDK 174, or the container application 167 can receive the command from the management service 120 or retrieve it from a command queue maintained by the management service 120 for the client device 109. The command can instruct a component of the client device 109 to install the client application 149 in a sandboxed environment separate from other client applications 149 installed on the client device 109.

In step 506, a component of the client device 109 can receive an extension map 200 or an updated extension map 200 to the client device 109. The extension map 200 can be transmitted along with the client application 149 or separately. The extension map 200 can include alias file extensions 209 for various combinations of file extensions 206 and application identifiers 203 of client applications 149.

In step 509, a client application 149 can receive, download, generate, or otherwise originate a file. Since the client application 149 has originated the file, the file can be stored in a sandboxed environment of the client application 149. The sandboxed environment can be provided using one or more of the container application 167 and the operating system 164. The file can include a particular file extension 206. In one non-limiting example, a browser client application 149 can download a certificate file with a ".pfx" extension from a network service 106.

In step 512, a component of the client device 109 can change the file extension 206 of the file to an alias file extension 209 according to the extension map 200. In a continuation of the nonlimiting example of the browser client application 149 and the .pfx certificate file, the management SDK 174 can map the browser application identifier 203 and the .pfx file extension 206 to the ".browspfx" alias file extension 209 according to the extension map 200. The management SDK 174 can store an aliased certificate file with the ".browspfx" alias file extension 209.

The client application 149 can use the management SDK 174 to monitor or search a memory area for files that include any of the file extensions 206 indicated for that client application 149. The memory area can correspond to a sandboxed environment of the client application 149. The management SDK 174 can identify each file that is stored in the memory area of the client application 149. The management SDK 174 can use the file extension 206 and an application identifier 203 of the client application 149 to identify an alias file extension 209 in the extension map 200. The management SDK 174 can then update the file by changing the file extension 206 to the alias file extension 209. The updated file can be referred to as an aliased file or extension aliased file.

In step 515, the client device 109 can transfer the aliased file using a file sharing utility of the operating system 164. In a continuation of the nonlimiting example of the aliased certificate file with the ".browspfx" alias file extension 209, a user can select the aliased certificate file. The user selection can bring up a list of applications that have registered the ".browspfx" alias file extension 209 with the operating system 164. The user can select a desired client application 149 and the file sharing utility can transfer the aliased certificate file. Even if the operating system 164 prevents certificate files with the .pfx extension from being transferred using the file sharing utility, the aliased certificate file with the ".browspfx" alias file extension 209 can be transferred.

Generally, the alias file extension 209 of the aliased file can enable a user to transfer these files from the client application 149 to other client applications 149 that have registered the alias file extensions 209 with the operating system 164. The alias file extension 209 can also enable the client application 149a to transfer the files that the operating system 164 would otherwise block from being shared using its file sharing utility.

A user can perform a user interface interaction relative to the aliased file that initiates a file sharing request. A list of applications can be shown in response to the file sharing request. The operating system 164 can provide the list of applications that have registered the alias file extension 209 of the extension-aliased file. Since the alias file extension 209 is unique among a set of known file extensions in the extension data 132, the list of applications can be limited to client applications 149 that the enterprise has indicated to use the alias file extension 209. The user can select a recipient client application 149 from the list, and the file sharing utility of the operating system 164 can perform a file transfer of the aliased file.

Figure 6:
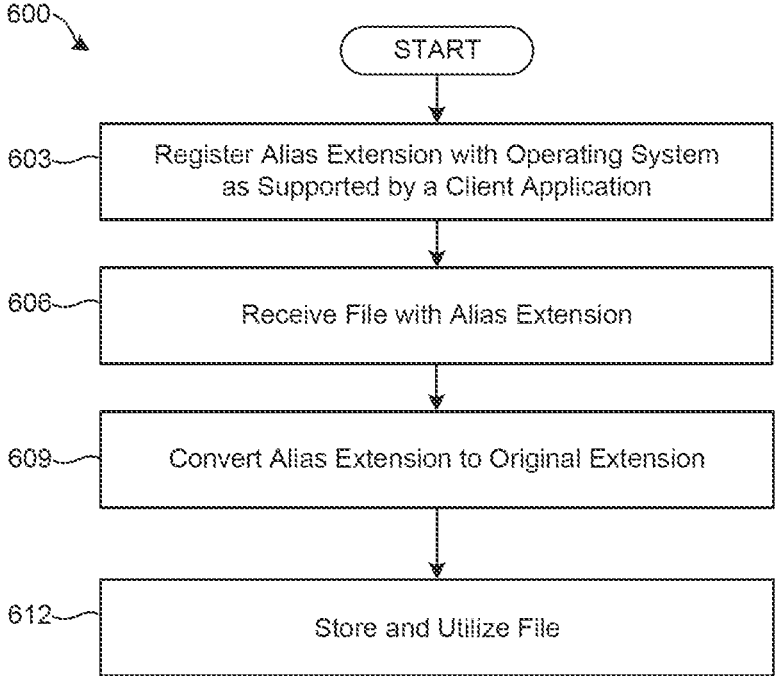
FIG. 6 is an example flowchart illustrating functionality implemented by components of the networked environment of FIG. 1.

FIG. 6 shows a flowchart 600 that illustrates functionality implemented by components of the networked environment 100. Specifically, the flowchart 600 shows how a client application 149 and other components executed by the client device 109 can receive an aliased file that includes an alias file extension 209, convert it back to the original file extension 206, and store the file for use. Particular steps can be described as being performed by the client device 109 generally or a particular component. One or more components of the client device 109 and the networked environment 100 can perform aspects of the steps.

In step 603, a component of the client device 109 can communicate with the operating system 164 to register an alias file extension 209 in association with a client application 149. The client device 109 can receive extension data 132 that indicates a set of alias extensions to register with the operating system 164, in addition the set of extensions that the particular client application 149 typically handles by default. In some examples, the client application 149 can update the operating system 164 to register the alias file extension 209 during installation of the client application 149 or as part of an update for the client application 149. As a result, the client application 149 can appear in a list of applications provided by the file sharing utility of the operating system 164. The client application 149 can include an identity manager client application 149 that identifies itself as supporting the non-standard ".browspfx" alias file extension 209. The identity manager client application 149 can be incapable of actually consuming or using a file with the ".browspfx" alias file extension 209. The ".browspfx" alias file extension 209 is instead registered so that the identity manager client application 149 can appear in a list of applications provided by the file sharing utility of the operating system 164.

In step 606, the client application 149 can receive a file through the file sharing utility of the operating system 164. The file can include an aliased file that has an alias file extension 209. The management SDK 174 can identify all files that are received through the file sharing utility of the operating system 164, and check whether the file includes an alias file extension 209. For example, the identity manager client application 149 can receive a file with a ".browspfx" extension through the file sharing utility of the operating system 164.

In step 609, the management SDK 174 can automatically convert the alias file extension 209 to the original file extension 206. The management SDK 174 can use the extension map 200 to map the alias file extension 209 to a corresponding operative or standard file extension 206. In the example of a file with a ".browspfx" extension, the management SDK 174 can use the extension map 200 to identify the ".browspfx" as an alias file extension 209. The management SDK 174 can map the ".browspfx" alias file extension 209 to identify that the originating application is the browser client application 149 and the original operative file extension 206 is ".pfx."

In step 612, the management SDK 174 can store the reverted file with its original file extension 206. The client application 149 can then utilize the file, for example, by opening or consuming the file. This can enable the client application 149 to receive and utilize a protected file type though the file sharing utility of the operating system 164. This process can also limit the aliased files to being transferred to a set of approved client applications 149 indicated in the extension data 132. In the example of a certificate file reverted to a ".pfx" file extension 206, the identity manager client application 149 can install the certificate file with the ".pfx" file extension 206 for signing files and other authentication operations.

The client devices 109, devices of the management system 103, and devices of the application hosting system can include at least one processor circuit, for example, having a processor and at least one memory device, both of which couple to a local interface, respectively. The device can include, for example, at least one computer, mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a client application 149, container application 167, client application 149 or another application can be rendered. The user interface can be generated with user interface data provided by the management system 103. The client devices 109 can also include one or more input/output devices that can include, for example, a capacitive touchscreen or other type of touch input device, fingerprint reader, or keyboard.

Although the management service 120, client applications 149, container application 167, client applications 149 and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system comprising:

a client computing device; and a memory accessed by the client computing device, wherein the memory comprises machine-readable instructions that when executed by at least one processor, cause the client computing device to at least:

receive a policy from a management server, the policy including an extension map that relates a file extension of a certificate file to an alias file extension, wherein the policy identifies (i) a first application that is permitted to change the file extension of the certificate file to the alias file extension and (ii) a second application that is permitted to change the alias file extension of the certificate file to the file extension;

register an identity manager application with an operating system of the client computing device to indicate that the identity manager application supports files having the alias file extension, wherein the operating system includes a file sharing utility that prohibits transferring files having the file extension between applications but permits transferring files having the alias file extension between applications;

detect, by a management software development kit (SDK) used by a web browser application that the certificate file having the file extension has been downloaded to a sandboxed memory location of the web browser application, wherein the identity manager application is configured to use the certificate file having the file extension to perform one or more authentication operations and wherein the identity manager application lacks access to the sandboxed memory location of the web browser application;

determine, by the management SDK, that the web browser application is identified in the policy as the first application that is permitted to change the file extension to the alias file extension;

store the certificate file as an extension-aliased file by changing the file extension of the certificate file to the alias file extension according to the extension map, wherein changing the file extension of the certificate file to the alias file extension renders the extension-aliased file inoperative for the identity manager application for performing the one or more authentication operations;

transfer the extension-aliased file to the identity manager application using the file sharing utility of the operating system of the client computing device;

determine the file extension of the extension-aliased file based on the extension map; and determine that the identity manager application is identified in the policy as the second application that is permitted to change the alias file extension to the file extension;

in response to determining that the identity manager application is identified in the policy as the second application, convert the extension-aliased file to the certificate file by changing the alias file extension to the file extension, wherein converting the extension-alias file to the certificate file makes the certificate file operable for the identity manager application to perform the one or more authentication operations.

2. The system of claim 1, wherein the instructions, when executed by the at least one processor, cause the client computing device to at least:

identify, by the management SDK, the alias file extension in the extension map based on the file extension, and an application identifier.

3. The system of claim 1, wherein the instructions, when executed by the at least one processor, cause the client computing device to at least:

generate a user interface element comprising a list of applications based at least in part on a user-initiated request to transfer the extension-aliased file, wherein the list includes the identity manager application.

4. The system of claim 3, wherein the identity manager application is included in the list based at least in part on the identity manager application being registered with the operating system as supporting the alias file extension of the extension-aliased file.

5. A method comprising:

receiving, by a client device, a policy from a management server, the policy including an extension map that relates a file extension of a certificate file to an alias file extension, wherein the policy identifies (i) a first application that is permitted to change the file extension of the certificate file to the alias file extension and (ii) a second application that is permitted to change the alias file extension of the certificate file to the file extension;

registering an identity manager application with an operating system of the client device to indicate that the identity manager application supports files having the alias file extension, wherein the operating system includes a file sharing utility that prohibits transferring files having the file extension between applications but permits transferring files having the alias file extension between applications;

detecting, by a management software development kit (SDK) used by a web browser application that the certificate file having the file extension has been downloaded to a sandboxed memory location of the web browser application, wherein the identity manager application is configured to use the certificate file having the file extension to perform one or more authentication operations and wherein the identity manager application lacks access to the sandboxed memory location of the web browser application;

determining, by the management SDK, that the web browser application is identified in the policy as the first application that is permitted to change the file extension to the alias file extension;

storing the certificate file as an extension-aliased file by changing the file extension of the certificate file to the alias file extension according to the extension map, wherein changing the file extension of the certificate file to the alias file extension renders the extension-aliased file inoperative for the identity manager application for performing the one or more authentication operations;

transferring the extension-aliased file to the identity manager application using the file sharing utility of the operating system of the client device;

determining the file extension of the extension-aliased file based on the extension map; and determining that the identity manager application is identified in the policy as the second application that is permitted to change the alias file extension to the file extension;

in response to determining that the identity manager application is identified in the policy as the second application, converting the extension-aliased file to the certificate file by changing the alias file extension to the file extension, wherein converting the extension-alias file to the certificate file makes the certificate file operable for the identity manager application to perform the one or more authentication operations.

6. The method of claim 5, further comprising:

identifying, by the management SDK, the alias file extension in the extension map based on the file extension, and an application identifier.

7. The method of claim 5, further comprising:

generating, by the client device, a user interface element comprising a list of applications based at least in part on a user-initiated request to transfer the extension-aliased file, wherein the list includes the identity manager application.

8. The method of claim 7, wherein the identity manager application is included in the list based at least in part on the identity manager application being registered with the operating system as supporting the alias file extension of the extension-aliased file.

9. A non-transitory computer-readable medium comprising machine-readable instructions, wherein the instructions, when executed by at least one processor, cause a client computing device to at least:

receive a policy from a management server, the policy including an extension map that relates a file extension of a certificate file to an alias file extension, wherein the policy identifies (i) a first application that is permitted to change the file extension of the certificate file to the alias file extension and (ii) a second application that is permitted to change the alias file extension of the certificate file to the file extension;

register an identity manager application with an operating system of the client computing device to indicate that the identity manager application supports files having the alias file extension, wherein the operating system includes a file sharing utility that prohibits transferring files having the file extension between applications but permits transferring files having the alias file extension between applications;

detect, by a management software development kit (SDK) used by a web browser application, that the certificate file having the file extension has been downloaded to a sandboxed memory location of the web browser application, wherein the identity manager application is configured to use the certificate file having the file extension to perform one or more authentication operations and wherein the identity manager application lacks access to the sandboxed memory location of the web browser application;

determine, by the management SDK, that the web browser application is identified in the policy as the first application that is permitted to change the file extension to the alias file extension;

store the certificate file as an extension-aliased file by changing the file extension of the certificate file to the alias file extension according to the extension map, wherein changing the file extension of the certificate file to the alias file extension renders the extension-aliased file inoperative for the identity manager application for performing the one or more authentication operations;

transfer the extension-aliased file to the identity manager application using the file sharing utility of the operating system of the client computing device;

determine the file extension of the extension-aliased file based on the extension map; and determine that the identity manager application is identified in the policy as the second application that is permitted to change the alias file extension to the file extension;

in response to determining that the identity manager application is identified in the policy as the second application, convert the extension-aliased file to the certificate file by changing the alias file extension to the file extension, wherein converting the extension-alias file to the certificate file makes the certificate file operable for the identity manager application to perform the one or more authentication operations.

10. The non-transitory computer-readable medium of claim 9, wherein the instructions, when executed by the at least one processor, cause the client computing device to at least:

identify, by the management SDK, the alias file extension in the extension map based on the file extension, and an application identifier.

11. The non-transitory computer-readable medium of claim 9, wherein the instructions, when executed by the at least one processor, cause the client computing device to at least:

generate a user interface element comprising a list of applications based at least in part on a user-initiated request to transfer the extension-aliased file, wherein the list includes the identity manager application.

* * * * *